United States Patent [19]

Sattler

[11] 4,357,219

[45] Nov. 2, 1982

[54] SOLVENTLESS UV CURED THERMOSETTING CEMENT COAT

[75] Inventor: Frank A. Sattler, Monroeville, Pa.

[73] Assignee: Westinghouse Electric Corp., Pittsburgh, Pa.

[21] Appl. No.: 163,900

[22] Filed: Jun. 27, 1980

[51] Int. Cl.$^3$ ............................................. C08F 2/50
[52] U.S. Cl. ........................... 204/159.15; 204/159.19; 204/159.23; 525/454; 525/455; 525/456; 525/489
[58] Field of Search .................. 204/159.15, 159.19

[56] References Cited

U.S. PATENT DOCUMENTS

| | | | |
|---|---|---|---|
| 4,135,007 | 1/1979 | Lorenz et al. | 204/159.16 |
| 4,156,035 | 5/1979 | Tsao et al. | 204/159.16 |
| 4,222,835 | 9/1980 | Dixon | 204/159.16 |

*Primary Examiner*—John C. Bleutge
*Assistant Examiner*—Arthur H. Koeckert
*Attorney, Agent, or Firm*—R. D. Fuerle

[57] ABSTRACT

Disclosed is a solvent-free wire enamel cement coat which is curable to the B-stage with ultraviolet light. The wire can then be formed into a coil and cured with heat to the C-stage. The cement coat composition comprises a mixture of a UV photosensitizer and a curing agent with either an acrylated epoxy or an amine terminated acrylated epoxy or an acrylated urethane, or mixtures thereof, all dissolved in a monoacrylate. The composition can also include an end-blocked urethane, an acrylated hexamethoxymethyl melamine, or a low molecular weight cresol formaldehyde resin.

5 Claims, No Drawings

4,357,219

SOLVENTLESS UV CURED THERMOSETTING CEMENT COAT

BACKGROUND OF THE INVENTION

Wire which has been insulated with a fully cured wire enamel is often coated with a cement coat which is generally thermoplastic. When the wire is wrapped into a coil and heated, the cement coat softens and forms a continuous resinous solid which holds all of the wires together. When thermosetting resins are used as cement coats and are cured to the B-stage they generally become too brittle after shelf aging and do not wind properly.

SUMMARY OF THE INVENTION

I have discovered a thermosetting cement coat which is cured to the B-stage with ultraviolet light and then is cured to the C-stage thermally. The cement coat composition of this invention does not employ a solvent and therefore not only saves on the cost of solvent but also saves on the cost of evaporating the solvent and preventing pollution by the solvent when it is evaporated. The cement coat of this invention is tough and flexible and can be readily fused and cross-linked into a thermoset resin by subsequent mild heat treatment after winding.

DESCRIPTION OF THE INVENTION

The cement coat composition of this invention requires an ultraviolet photosensitizer and a curing agent and either an acrylated epoxy, an amine terminated acrylated epoxy, or an acrylated urethane, all dissolved in a monoacrylate.

ACRYLATED EPOXY DISSOLVED IN MONOACRYLATE

The first component of the cement coat composition of this invention is an acrylated epoxy dissolved in a monoacrylate. This component is prepared by first making an anhydride ester by reacting an anhydride with a hydroxy acrylate. The anhydride may be either trimellitic anhydride or phthalic anhydride. Trimellitic anhydride (TMA) is preferred because the reaction of a hydroxy acrylate with TMA produces an acrylated ester which has two carboxyl groups, while the use of phthalic anhydride produces an acrylated ester which has only one carboxyl group and is chain terminating in the epoxy reaction. The hydroxy acrylate that is reacted with the anhydride is a compound having one hydroxyl group and one acrylate group. The preferred hydroxy acrylate is 2-hydroxy ethyl acrylate because it is commercial and is readily available, but 3-hydroxy propyl acrylate could also be used. The reaction requires an inhibitor to keep the acrylate from polymerizing. About 0.02 to about 0.2% (based on the weight of the anhydride plus the acrylate) of an inhibitor should be used. Benzoquinone, hydroquinone, and the monomethyl ether of hydroquinone are the preferred inhibitors but quinhydrone, resorcinol, catechol, and other inhibitors can also be used. The molar ratio of anhydride to hydroxy acrylate should be about 1:1. The mixture is heated to an acid number of approximately 364 for the trimellitic anhydride adduct and 212 for the phthalic anhydride adduct, which generally requires about an hour and a half at 120° C. The product, an anhydride ester, has two free carboxyl groups and one acrylic group when TMA is used and one free carboxyl and one acrylic group when phthalic anhydride is used.

The anhydride ester is then reacted with an epoxy to produce the acrylated epoxy. The epoxy must be a bisphenol A epoxy having an epoxy equivalent weight (E.E.W.) of about 175 to about 5,000. The low epoxy equivalent weight resins produce coatings which are too brittle and higher epoxy equivalent weight resins produce a composition which is too viscous and requires too much monomer to lower its viscosity. A preferred epoxy equivalent weight range is about 850 to about 5,000. About one equivalent of the anhydride ester is reacted with two equivalents of the epoxy ±10%. About 0.2 to about 1% based on the weight of the charge of a catalyst is required for this reaction. Tertiary amines such as benzyl dimethyl amine or triethanolamine may be used as catalysts. The mixture is heated to an acid number of less than 20 which generally requires heating at 120° to 140° C. for about an hour.

The acrylated epoxy is then dissolved in a monoacrylate. The preferred monoacrylate is phenoxyethyl acrylate as it is a good solvent and has a good polymerization rate, but ethoxyethyl acrylate can also be used to reduce the viscosity. Dicyclopentadiene acrylate can also be used. In addition, wherever a monoacrylate is used in this invention, up to about 10% of the monoacrylate can be replaced with an unsaturated monomer diluent such as N-vinyl pyrrolidone, styrene, vinyl toluene, or a diacrylate such as tetraethylene glycol diacrylate or 1,6-hexanediol diacrylate. The solution of the acrylated epoxy should be about 25 to about 50% monoacrylate and about 50 to about 75% acrylated epoxy, as less monoacrylate is too viscous and more reduces the properties of the cement coat and is too expensive.

AMINE TERMINATED ACRYLATED EPOXY DISSOLVED IN MONOACRYLATE

An optional ingredient which can be added for increased chemical resistance and bond strength is an amine terminated acrylated epoxy dissolved in a monoacrylate. This product can be prepared by simply reacting two moles of diamine with each mole of the acrylated epoxy previously described, i.e., two equivalents of amine per epoxy equivalent. No catalyst is required for the reaction. The mixture is simply heated until all the epoxy groups are reacted which can be determined by infrared if desired. Generally the reaction requires about an hour at 120° C. The product is then dissolved in a monoacrylate as was the previously described acrylated epoxy. The terminating amine groups react with the end-blocked urethane in the blend when the cement coat is heated.

ACRYLATED URETHANE DISSOLVED IN MONOACRYLATE

The acrylated urethane is prepared by first reacting a diisocyanate with a diol to prepare a urethane. Toluene diisocyanate is preferred as it is commercially available and works well, but 4,4' diisocyanato diphenyl methane could also be used. The preferred diols are triethylene glycol and 1.4 butane diol as they give a product having greater flexibility, but propylene glycol and neopentyl glycol could also be used. No catalyst is required. The ratio of glycol to diisocyanate can vary from about 1 mole glycol to 2 moles of diisocyanate up to 7 moles of glycol to 8 moles of diisocyanate. A preferred ratio is about 3 moles of glycol to about 4 moles of diisocyanate. The reaction proceeds by heating at about 125° C. for about an hour.

The urethane is then acrylated by reaction with a hydroxy acrylate. The preferred hydroxy acrylate is 2-hydroxyethyl acrylate, but 3-hydroxypropyl acrylate could also be used. This reaction proceeds with the remaining isocyanate group to produce the acrylated urethane. Heating for one hour at about 120° C. is usually sufficient to complete the reaction.

The acrylated urethane is then dissolved in a monoacrylate which contains about 0.02 to about 0.2% (based on total weight of this component) of an inhibitor to prevent polymerization. The monoacrylate should constitute about 20 to about 50% of this solution and the urethane the other 50 to 80%.

END-BLOCKED URETHANE DISSOLVED IN MONOACRYLATE

Another optional ingredient, which preferably is present, however, is an end-blocked urethane dissolved in a monoacrylate. The purpose of this component is to couple the acrylated epoxy with the other materials. Urethanes which can be used include commercial products such as "Mondur S," a product of 3 moles of toluene diisocyanate reacted with 1 mole of trimethylolpropane end-blocked with 3 moles of phenol, sold by Mobay Chemical Company. The end-blocked urethane can also be prepared by first reacting 3 moles of phenol with 3 moles of a diisocyanate. Toluene diisocyanate is preferred but 4,4' diisocyanato diphenyl methane could also be used. This reaction proceeds without a catalyst by heating at about 60° C. for about an hour. The product is an isocyanate partially end-blocked with a phenol. Three moles of that product is then reacted with one mole of a triol such as trimethylolethane to produce the end-blocked urethane. This second reaction proceeds readily by heating for about an hour at 120° C. The final product is then dissolved in a monoacrylate which contains about 0.02 to about 0.2% (based on total weight of this component) of an inhibitor to prevent polymerization. The monoacrylate should constitute about 20 to about 50% of this solution and the urethane the other 50 to 80%.

ACRYLATED HEXAMETHOXYMETHYL MELAMINE DISSOLVED IN MONOACRYLATE

Another optional component which increases crosslinking in the cured stage is an acrylated hexamethoxymethyl melamine dissolved in a monoacrylate. The product is prepared in three steps. In the first step a diisocyanate is reacted with a hydroxy acrylate in equimolar proportions to produce an acrylated isocyanate. Suitable diisocyanates include toluene diisocyanate or 4,4' diisocyanato diphenyl methane. Suitable hydroxy acrylates include 2-hydroxyethyl acrylate, which is preferred, and 3-hydroxypropyl acrylate. The reaction proceeds without a catalyst by heating for about 1 hour at 60° C.

The acrylated isocyanate is then reacted with hexamethoxymethyl melamine (Cymel) in a ratio of 2 moles acrylated isocyanate to 1 mole hexamethoxymethyl melamine ±10% to produce the acrylated hexamethoxymethyl melamine. About 0.02 to about 0.2% of an inhibitor should also be present to prevent polymerization of the acrylate. Generally heating at 120° to 125° for about a half hour is sufficient.

The acrylated Cymel is then dissolved in a monoacrylate. Phenoxyethyl acrylate and ethoxyethyl acrylate are preferred, but dicyclopentadiene acrylate could also be used. The solution should be about 10 to about 30% monoacrylate and about 70 to about 90% of the acrylated Cymel.

LOW MOLECULAR WEIGHT CRESOL FORMALDEHYDE RESIN DISSOLVED IN MONOACRYLATE

Another optional ingredient which contributes some specific chemical resistance is a low molecular weight cresol formaldehyde resin dissolved in a monoacrylate. This product is prepared from m,p-cresol which can contain up to 60% of phenol or xylenol, though preferably it is 100% m,p-cresol as that results in a more reproducible resin. The m,p-cresol is reacted with formaldehyde which is conventionally sold as a 40% aqueous solution. About 0.5 to about 2% (based on the weight of the m,p-cresol and the formaldehyde) of a catalyst is required. Tertiary amines are generally used as catalysts and triethanolamine is the preferred tertiary amine. The mixture is refluxed for 1 hour to produce the resin. Then about 0.5 to about 2% based on total solid weight of salicylic acid is added to neutralize the amine. The mixture is then heated at about 60° to about 90° C. at 50 mm of mercury pressure to draw off the water. The final product is then dissolved in an acrylate monomer. The solution should be about 10 to about 20% monoacrylate and about 80 to about 90% resin.

UV PHOTOINITIATOR

A UV photoinitiator is also required to initiate polymerization of the acrylate groups in the presence of UV light. The UV initiator is a source of free radicals which are generated when exposed to UV light. UV initiators are generally benzoin ethers, are sold commercially and are well known in the art. Commercially photoinitiators which work well in these formulations are "Vicure 10" and "Vicure 30" photoinitiators (Stauffer Chemical Co.) and "Igsacure 651" photoinitiator (Ciba-Geigy).

CURING AGENT

A thermal curing agent is desired to further polymerize the cement coat once the wire is formed into a coil. Peroxides are generally used as curing agents. Tertiary butyl perbenzoate is the preferred curing agent, but benzoyl peroxide, methyl ethyl ketone peroxide, tertiary butyl peracetate, and other free-radical forming catalysts can also be used.

THE CEMENT COAT COMPOSITION

The cement coat composition comprises about 40 to about 90% of the acrylated epoxy dissolved in monoacrylate, or the amine terminated acrylated epoxy dissolved in monoacrylate, or the acrylated urethane dissolved in monoacrylate, or combination thereof. The composition also includes up to about 35% based on total composition weight of the end-blocked urethane dissolved in monoacrylate, up to about 10% of an acrylated hexamethoxymethyl melamine dissolved in the monoacrylate, up to about 43% of the low molecular weight cresol formaldehyde resin dissolved in the monoacrylate, about 0.5 to about 5% of the UV photoinitiator, and about 0.2 to about 2% of the thermal curing agent.

The cement coat composition of this invention is applied after the undercoat has been applied to the wire and has been cured. Virtually any type of resin can be used for an undercoat, including polyester amideimides, Formvars, polyurethanes, and polyesters. The preferred undercoat is disclosed in copending patent application Ser. No. 163,899, filed concurrently herewith by the same inventor. The undercoat may be applied to any type of wire including copper and aluminum and the wire may be of any size and shape.

Once the undercoat is applied and cured the wire is passed through the cement coat composition. A typical wire speed is about 20 to about 50 feet per minute. The cement coat composition may be at room temperature or it can be heated up to about 60° C. or even higher to lower its viscosity. The wire then passes through a die and then between a bank of UV lights to cure the cement coat to the B-stage. About two 12-inch UV lights of about 200 watts per inch placed longitudinally on each side of the wire can be used. The wire is then wound on reels and stored until it is ready to be used. When used the wire is wound onto coils and the cement coat is thermally fused and cured at about 150° C. for about 2 hours to form a solid resinous mass.

The following examples further illustrate this invention.

EXAMPLE I

Part A—Acrylated Epoxy

Part I—Acrylated TMA

To a one liter reaction flask equipped with a motorized stirrer, thermometer, nitrogen sparge tube, and heating mantle was charged:
  384.2 g trimellitic anhydride (2.0 moles),
  232.2 g 2-hydroxyethyl acrylate (2.0 moles), and
  5.36 g benzoquinone.
The charge was reacted for an hour and a half at 120° C. to an acid number of 361 and was poured and cooled. The yield was 621 g.

Part II—Acrylated Epoxy

To a one liter reaction flask was added:
  79.8 g 2-phenoxyethyl acrylate,
  170.2 g bisphenol A epoxy resin having a epoxy equivalent weight of 850-975 sold by Shell Chemical Co. under the trade designation "Epon 1004,"
  14.4 g Part I, and
  1.7 g. triethanolamine.
The charge was reacted at 120° C. for 1 hour and
  88.7 g 2-phenoxyethyl acrylate and
  20.2 g m-phenylenediamine were added.
The reaction was continued at 120° C. for 1 hour. Then 75.0 g dicyclopentadiene acrylate was added. The yield was 450 g.

Part B—End-Blocked Urethane Dissolved In Monomer

To a 400 ml beaker was added, stirred, and dissolved
  100.0 g an end-blocked diisocyanate sold by Mobay Chemical Co. under the trade designation "Mondur S,"
  100.0 g ethoxyethyl acrylate, and
  0.2 g benzoquinone.

Part C—Acrylated Hexamethoxymethyl Melamine

Part I

To a one liter reaction flask equipped with nitrogen sparging was added
  394.8 g toluene diisocyanate which was 80% of the 2,4 isomer and 20% of the 2,6 isomer (2.27 moles) and
  263.5 g 2-hydroxyethyl acrylate (2.27 moles).
The charge was reacted at 60° for 1 hour with stirring. It was cooled and saved for reaction with Part II.

Part II

To a 500 ml reaction flask was added
  65.0 g hexamethoxymethyl melamine (sold by American Cyanamid under the trademark "Cymel 303"),
  96.7 g Part I, and
  0.2 g benzoquinone.
The charge was reacted at 120°–125° C. for ½ hour. Then 40.4 g phenoxy ethyl acrylate was added. The yield was 202 g.

Part D—End-Blocked Urethane Dissolved In Monomer

Part I.—Anhydride Ester

To a one liter reaction flask equipped with nitrogen sparging was added
  300.2 g triethylene glycol (2.0 moles) and
  98.1 g maleic anhydride (1.0 moles).
The charge was reacted at 180° C. increasing the temperature 10° C. per hour to 215° C. and the reaction was continued at 215° C. until 15 ml of water had condensed out of the reaction. The charge was cooled with inert gas sparging.

Part II.—End-Blocked Isocyanate

To a 400 ml beaker was added
  174.1 g toluene diisocyanate (1.0 moles) and
  56.5 g ε-caprolactam (0.5 moles).
The charge was heated at 120° C. for 1 hour and was added to Part I. The components were reacted at 125° C. for 2 hours. Then 152.6 g phenoxyethyl acrylate were added and 1.52 g benzoquinone. The yield was 763.2 g.

A cement coat blend was prepared by mixing 46.7% Part A, 13.3% Part B, 6.3% Part C, 28.9% Part D, 3.8% benzoin ether photoinitiator sold by Stauffer Chemical Co. under the trade designation "Vicure 10," 0.66% urethane activator sold by Abbot Laboratories under the trademark "Polycat 41," and 0.27% tertiary butyl perbenzoate. The blend was coated over commercial "heavy build" Formvar (polyvinyl formal-urethane phenolic blend) wire enamel on #18 A.W.G. aluminum wire. A solid 46 mil bullet die was used to apply the enamel over the 43 mil diameter Formvar wire at a speed of 20 ft/min. The wire passed through the coating die and then between two 12-inch ultraviolet lamps (each producing 200 watts/inch) placed parallel to the wire. The cement coat was tack-free and flexible at 1.0 mil thickness. The wire passed the snap test and a 200° C. heat shock test at 1X mandrel. Coil bond strength test samples were prepared according to NEMA MW 19C as follows.

A 0.250-inch mandrel was treated with a fluorocarbon release agent and a 3-inch long coil was prepared by tightly wrapping around the mandrel. The coil was baked at 150° C. for two hours with a 408 g weight compressing the coil. After the coil was fused and baked it was supported as a beam with 1¾ inches between supports and a weight applied to the center of the beam. The weight was gradually increased until the beam failed. The cement coat of this Example had a bond strength of 25 pounds of 25° C. and 4 pounds at 100° C.

EXAMPLE II

Part A Acrylated Urethane And Monomer

To a one liter reaction flask with nitrogen sparging was added
- 174.1 g toluene diisocyanate (1.0 mole),
- 147.0 g 2-phenoxyethyl acrylate, and
- 0.4 g benzoquinone.

The mixture was stirred and 112.5 g triethylene glycol (0.75 moles) was slowly added keeping the temperature below 120° C. The charge was reacted for 1 hour at 125° C. and 58.0 g hydroxyethyl acrylate (0.5 moles) was slowly added. The charge was reacted for 1 hour at 125° C. It was cooled and 54.4 g phenoxyethyl acrylate was added. The yield was 543 g.

Part B—Low Molecular Weight Cresol Formaldehyde Resin

To a two liter reaction flask with a reflux condenser was added
- 1144.0 g m,p-cresol,
- 5960 g 40% aqueous formaldehyde, and
- 22.4 g triethanolamine.

The charge was heated at reflux for 1 hour and 20.8 g of salicyclic acid was added. The charge was heated at 60° to 90° C. at a pressure of 50 mm mercury until a Gardner viscosity of Z-4 was obtained. Then 215.3 g phenoxyethyl acrylate was added and the charge was cooled. The yield was 1474.3 g.

A blend was prepared consisting of 77.9% Part A, 18.7% Part B, and 3.4% "Vicure 10" photoinitiator. The blend was coated over a wire which had a Formvar enamel undercoat. The wire passed through the blend at 33 ft/min and the blend was then cured with the UV light. The film thickness was 1 mil and the coating was smooth, flexible, and tack-free and passed a 1X mandrel heat shock test at 200° C. The bond strength after two hours of curing at 150° C. was 18 pounds at 25° C. and 4.2 pounds at 100° C.

EXAMPLE III

A blend was prepared of
- 52.6% Part A of Example II,
- 43.1% Part B of Example II,
- 3.8% "Vicure 10" photoinitiator, and
- 0.5% tertiary butyl perbenzoate.

The blend was applied over a Formvar enamel-coated wire at a wire speed of 33 ft/min. After UV curing the coating was smooth and flexible and had a thickness of 1.0 mil. The wire was wound on a test coil which was baked for 2 hours at 150° C. The coil had a bond strength of 20 pounds at 25° C. and 4.7 pounds at 100° C. A coil baked for 17 hours at 150° C. had a bond strength of 6.7 pounds at 100° C.

EXAMPLE IV

Part A—Acrylated Urethane

To a one liter reaction flask fitted with nitrogen sparge was added
- 348.2 g toluene diisocyanate (2.0 moles),
- 253.0 g phenoxyethyl acrylate, and
- 0.88 g benzoquinone.

Then 135.4 g of 1,4 butanediol (1.5 moles) was added slowly with cooling, keeping the exothermic temperature below 120° C. The charge was heated at 125° C. for 1 hour and cooled to 100° C. Then 116.0 g of hydroxyethyl acrylate was slowly added. The charge was heated for 1 hour at 125° C. and cooled. The yield was 853 g.

Part B—Acrylated Epoxy

Part I—Anhydride Ester

To a 200 ml beaker was added
- 148.1 g phthalic anhydride (1.0 mole),
- 116.1 g hydroxyethyl acrylate (1.0 mole),
- 2.0 g benzoquinone, and
- 1.0 g triethanolamine.

The charge was reacted with stirring at 125° C. for 2 hours to an acid number of 210. It was poured and cooled. The yield was 265 g.

Part-II

To a one liter reaction flask was added
- 240.0 g ethoxyethyl acrylate,
- 240.0 g phenoxyethyl acrylate,
- 2.88 g benzoquinone,
- 320.0 g bisphenol A epoxy resin having an epoxy equivalent weight of 4000–6000 sold by Celanese Coatings and Specialties Co. under the trade designation "Epirez 560,"
- 16.8 g Part I, and
- 0.336 g benzyl dimethylamine.

The charge was reacted for ½ hour at 125° C. It was poured and cooled. The yield was 818 g.

Part C—End-Blocked Urethane

To a 400 ml. beaker was added 174.1 g toluene diisocyanate (1.0 mole) and 113.1 g caprolactam (1.0 moles). The charge was reacted at 100° C. for ½ hour and cooled to 60° C. Then it was added to Part I of Part D of Example I. The charge was heated at 120°–125° C. for ½ hour and cooled. The yield was 660 g.

A blend was prepared using
- 24.5% Part A,
- 24.5% Part B,
- 18.0% Part B of Example I,
- 13.6% Part C,
- 9.8% phenoxyethyl acrylate,
- 6% Part B of Example II,
- 2.7% "Vicure 10" photoinitiator, and
- 0.3% tertiary butyl perbenzoate.

The blend was coated over an 18 A.W.G. aluminum wire which had been coated with Formvar. The coating speed was 20 ft/min. After UV cure the coating was smooth and flexible and had a thickness of 1.0 mil. A test coil was formed and was baked for 2 hours at 150° C. The coil bond strength was 30 pounds at 25° C. and 8.3 pounds at 100° C. A coil baked for 48 hours at 150° C. had a bond strength of 33 pounds at 25° C. and 16.9 pounds at 100° C.

EXAMPLE V

A blend was prepared using
- 58.2% Part A of Example II,
- 14.5% Part B of Example IV,
- 14.8% Part B of Example I,
- 8.1% Part C of Example IV,
- 4.0% "Vicure 10" photoinitiator, and
- 0.4% tertiary butyl perbenzoate The blend was coated on #18 A.W.G. aluminum with which had been coated with Formvar. The coating speed was 33 ft/min. After UV cure the coating was smooth and flexible at a thickness of 1.0 mil. The cement coated wire was shelf aged for six months at room temperature and retained good flexibility and a bond strength of 20 pounds at 25° C. when cured at 150° C. for 2 hours.

I claim:

1. A solventless thermosetting cement coat composition, curable with UV light to the B-stage in one step, then with heat to the C-stage in a separate step, comprising (A) about 40 to about 90% of a solution of about 25 to about 50% monoacrylate selected from the group consisting of phenoxyethyl acrylate, ethoxyethyl acrylate, dicyclopentadiene acrylate, and mixtures thereof and about 50 to about 75% of a compound selected from the group consisting of a acrylated epoxy prepared from an epoxy resin having a molecular weight of at least about 850, an amine terminated acrylated epoxy prepared from an epoxy resin having a molecular weight of at least about 850, an acrylated urethane, and mixtures thereof;

(B) up to about 35% of a solution of about 50 to about 80% end-blocked urethane and about 20 to about 50% monoacrylate;

(C) an amount up to about 43% sufficient to increase cross-linking of a solution of about 70 to about 90% acrylated hexamethoxymethyl melamine and about 10 to 30% monoacrylate;

(D) up to about 35% of a solution of about 80 to about 90% low molecular weight cresol formaldehyde resin and about 10 to about 20% monoacrylate;

(E) about 0.5 to about 5% of a UV photoinitiator; and (F) about 0.2 to about 2% of a curing agent.

2. A solventless thermosetting cement coat composition, curable with UV light to the B-stage in one step, then with heat to the C-stage in a separate step, comprising:

(A) about 40 to about 90% of a solution of about 25 to about 50% monoacrylate selected from the group consisting of phenoxyethyl acrylate, ethoxyethyl acrylate, dicyclopentadiene acrylate, and mixtures thereof and about 50 to about 75% of a compound selected from the group consisting of an acrylated epoxy, an amine terminated acrylated epoxy, and acrylated urethane, or mixtures thereof, where said acrylated epoxy is the reaction product of a bisphenol-A epoxy having a molecular weight of at least about 850 and an acrylated anhydride, where said acrylated anhydride is the reaction product of an hydroxy acrylate and an anhydride selected from the group consisting of trimellitic anhydride, phthalic anhydride, and mixtures thereof, where said amine terminated acrylated epoxy is the reaction product of a diamine and an acrylated epoxy prepared from an epoxy resin having a molecular weight of at least about 850, and where said acrylated urethane is the reaction products of a urethane with a compound selected from the group consisting of caprolactam, hydroxy acrylates, and mixtures thereof;

(B) up to about 35% of a solution of about 50 to about 80% end-blocked urethane and about 20 to about 50% monoacrylate, and where said end-blocked urethane is a reaction product of a triol with an end-blocked isocyanate, where said end-blocked isocyanate is the reaction product of a diisocyanate and a phenol;

(C) an amount up to about 10% sufficient to increase cross-linking of a solution of about 70 to about 90% acrylated hexamethoxymethyl melamine and about 10 to about 30% monoacrylate, where said acrylated hexamethoxymethyl melamine is the reaction product of hexamethoxymethyl melamine, and an acrylated isocyanate, where said acrylated isocyanate is the reaction product of a diisocyanate and a hydroxy acrylate;

(D) up to about 35% of a solution of about 80 to about 90% low molecular weight cresol formaldehyde resin and about 10 to about 20% monoacrylate, where said cresol formaldehyde resin is the reaction product of formaldehyde with a compound selected from the group consisting of about 40 to about 100% m, p-cresol and up to about 60% of a compound selected from the group consisting of phenol, xylenol, and mixtures thereof;

(E) about 0.5 to about 5% of a UV photoinitiator; and (F) about 0.2 to about 2% of a curing agent.

3. A solventless thermosetting cement coat composition, curable with UV light to the B-stage in one step, then with heat to the C-stage in a separate step, comprising (A) about 40 to about 90% of a solution of about 25 to about 50% monoacrylate selected from the group consisting of phenoxyethyl acrylate, ethoxyethyl acrylate, dicyclopentadiene acrylate, and mixtures thereof and about 50 to about 75% of a compound selected from the group consisting of an acrylated epoxy prepared from an epoxy resin having a molecular weight of at least about 850, an amine terminated acrylated epoxy prepared from an epoxy resin having a molecular weight of at least about 850, an acrylated urethane, and mixtures thereof;

(B) up to about 35% of a solution of about 50 to about 80% end-blocked urethane and about 20 to about 50% monoacrylate;

(C) up to about 43% of a solution of about 70 to about 90% acrylated hexamethoxymethyl melamine and about 10 to about 30% monoacrylate;

(D) an amount up to about 35% sufficient to improve chemical resistance of a solution of about 80 to about 90% low molecular weight cresol formaldehyde resin and about 10 to about 20% monoacrylate;

(E) about 0.5 to about 5% of a UV photoinitiator; and (F) about 0.2 to about 2% of a curing agent.

4. A solventless thermosetting cement coat composition, curable with UV light to the B-stage in one step, then with heat to the C-stage in a separate step, comprising (A) about 40 to about 90% of a solution of about 25 to about 50% monoacrylate selected from the group consisting of phenoxyethyl acrylate, ethoxyethyl acrylate, dicyclopentadiene acrylate, and mixtures thereof and about 50 to about 75% of a compound selected from the group consisting of an acrylated epoxy prepared from an epoxy resin having a molecular weight of at least about 850, an amine terminated acrylated epoxy prepared from an epoxy resin having a molecular weight of at least about 850, and mixtures thereof;

(B) up to about 35% of a solution of about 50 to about 80% end-blocked urethane and about 20 to about 50% monoacrylate;

(C) up to about 43% of a solution of about 70 to about 90% acrylated hexamethoxymethyl melamine and about 10 to about 30% monoacrylate;

(D) up to about 35% of a solution of about 80 to about 90% low molecular weight cresol formaldehyde resin and about 10 to about 20% monoacrylate;

(E) about 0.5 to about 5% of a UV photoinitiator; and (F) about 0.2 to about 2% of a curing agent.

5. A solventless thermosetting cement coat composition, curable with UV light to the B-stage in one step, then with heat to the C-stage in a separate step, comprising:

(A) about 40 to about 90% of a solution of about 25 to about 50% monoacrylate selected from the group consisting of phenoxyethyl acrylate, ethoxyethyl acrylate, dicyclopentadiene acrylate, and mixtures thereof and about 50 to about 75% of a compound selected from the group consisting of an acrylated epoxy, an amine terminated acrylated epoxy, and acrylated urethane, or mixtures thereof, where said acrylated epoxy is the reaction product of a bisphenol-A epoxy having a molecular weight of at least about 850 and an acrylated anhydride, where said acrylated anhydride is the reaction product of an hydroxy acrylate and an anhydride selected from the group consisting of trimellitic anhydride, phthalic anhydride, and mixtures thereof, where said amine terminated acrylated epoxy is the reaction product of a diamine and an acrylated epoxy prepared from an epoxy resin having a molecular weight of at least about 850, and where said acrylated urethane is the reaction products of a urethane with a compound selected from the group consisting of caprolactam hydroxy acrylates, and mixtures thereof;

(B) up to about 35% of a solution of about 50 to about 80% end-blocked urethane and about 20 to about 50% monoacrylate, and where said end-blocked urethane is a reaction product of a triol with an end-blocked isocyanate, where said end-blocked isocyanate is the reaction product of a diisocyanate and a phenol;

(C) up to about 10% of a solution of about 70 to about 90% acrylated hexamethoxymethyl melamine and about 10 to about 30% monoacrylate, where said acrylated hexamethoxymethyl melamine is the reaction product of hexamethoxymethyl melamine, and an acrylated isocyanate, where said acrylated isocyanate is the reaction product of a diisocyanate and a hydroxy acrylate;

(D) an amount up to about 35% sufficient to improve chemical resistance of a solution of about 80 to about 90% low molecular weight cresol formaldehyde resin and about 10 to about 20% monoacrylate, where said cresol formaldehyde resin is the reaction product of formaldehyde with a compound selected from the group consisting of about 40 to about 100% m,p-cresol and up to about 60% of a compound selected from the group consisting of phenol, xylenol, and mixtures thereof;

(E) about 0.5 to about 5% of a UV photoinitiator; and (F) about 0.2 to about 2% of a curing agent.

* * * * *

UNITED STATES PATENT AND TRADEMARK OFFICE
CERTIFICATE OF CORRECTION

PATENT NO. : 4,357,219
DATED : November 2, 1982
INVENTOR(S) : Frank A. Sattler

It is certified that error appears in the above—identified patent and that said Letters Patent is hereby corrected as shown below:

Column 9, line 26, cancel "43" and substitute -- 10 --.

Column 9, line 29, cancel "35" and substitute -- 43 --.

Column 10, line 10, cancel "35" and substitute -- 43 --.

Column 10, line 40, cancel "43" and substitute -- 10 --.

Column 10, line 43, cancel "35" and substitute -- 43 --.

Column 11, line 1, cancel "43" and substitute -- 10 --.

Column 11, line 4, cancel "35" and substitute -- 43 --.

Column 12, line 20, cancel "35" and substitute -- 43 --.

Signed and Sealed this

Twelfth Day of July 1983

[SEAL]

Attest:

Attesting Officer

GERALD J. MOSSINGHOFF
Commissioner of Patents and Trademarks